Figure 1:
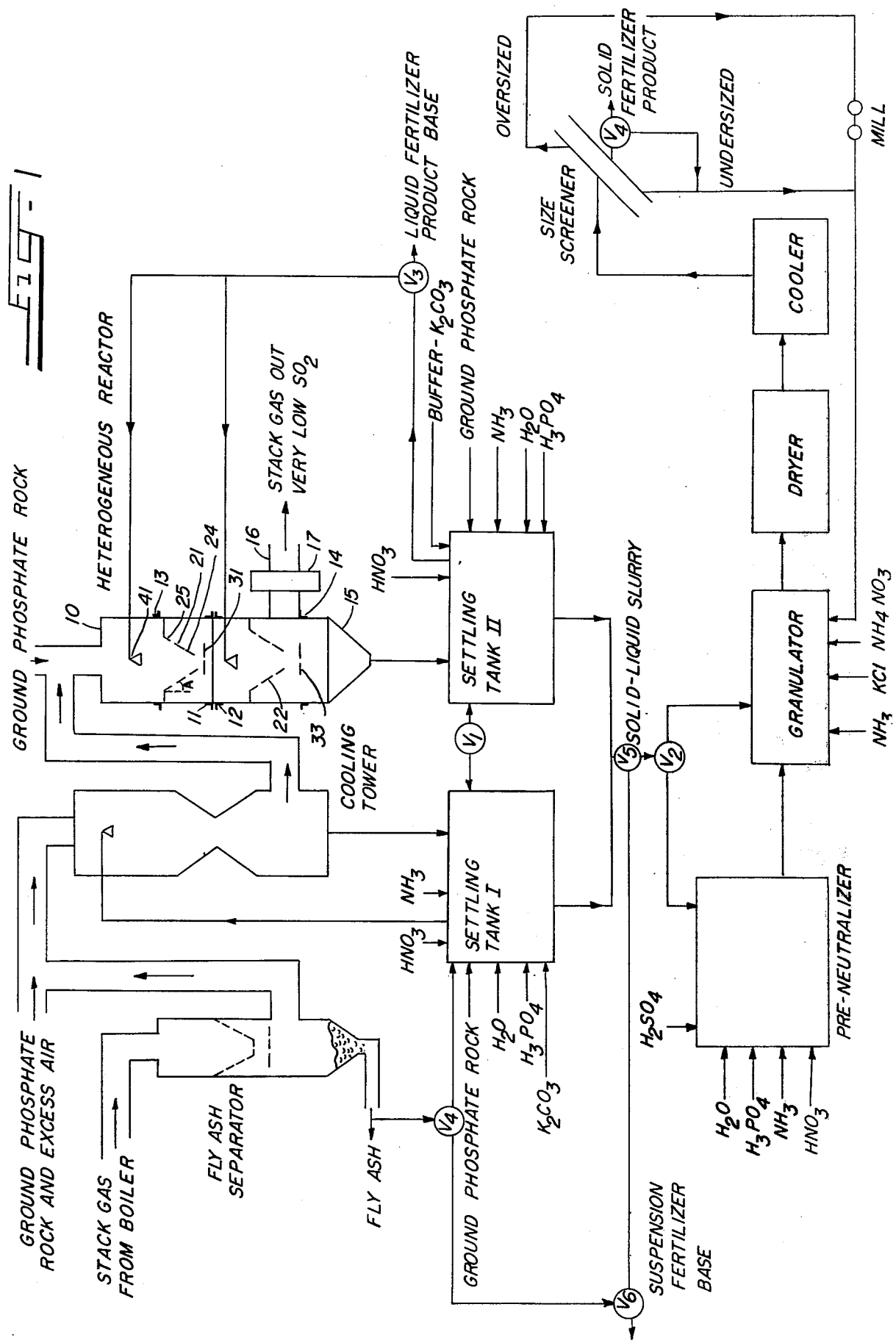

United States Patent [19]
Pircon et al.

[11] 4,073,634
[45] Feb. 14, 1978

[54] PROCESS FOR PRODUCTION OF FERTILIZERS

[76] Inventors: Ladislav J. Pircon, 305 Canterbury Lane, Oak Brook, Ill. 60521; Ralph E. Peck, 3100 S. Michigan Ave., Chicago, Ill. 60616

[21] Appl. No.: 677,778

[22] Filed: Apr. 16, 1976

[51] Int. Cl.² .............................................. C05B 11/08
[52] U.S. Cl. ......................................... 71/37; 71/40; 55/73; 423/242
[58] Field of Search ................. 55/73; 423/242; 71/31, 71/37, 40

[56] References Cited
U.S. PATENT DOCUMENTS

| | | | |
|---|---|---|---|
| 2,106,223 | 1/1938 | Nordengren | 71/40 |
| 2,849,278 | 8/1958 | Feldt | 71/40 X |
| 3,687,613 | 8/1972 | Rickard | 55/73 X |
| 3,767,777 | 10/1973 | Frye et al. | 55/73 X |
| 3,807,962 | 4/1974 | Gustavsson | 55/73 X |
| 3,957,465 | 5/1976 | Pircon | 55/90 |
| 3,969,482 | 7/1976 | Teller | 55/73 X |

Primary Examiner—Frank A. Spear, Jr.
Assistant Examiner—Ferris H. Lander
Attorney, Agent, or Firm—Thomas W. Speckman

[57] ABSTRACT

A process for the production of fertilizer comprising reacting sulfur oxide containing gas and water in a multiple state reactor to form sulfur containing acid, reacting the sulfur containing acid with a basic ion selected from the group consisting of calcium, ammonium and potassium ions, the calcium being derived from a salt selected from the group consisting of phosphatic and nitrogeneous salts, to form a fertilizer selected from the group consisting of phosphatic, nitrogeneous and potassium fertilizers and combinations thereof. This process is suitable for the utilization of sulfur oxides resulting from the combustion of high sulfur containing fossil fuels and sulfur producing chemical processes. The process of this invention enables the utilization of low concentration sulfur acid in the acidification of phosphate rock utilizing a multiple state reactor.

10 Claims, 2 Drawing Figures

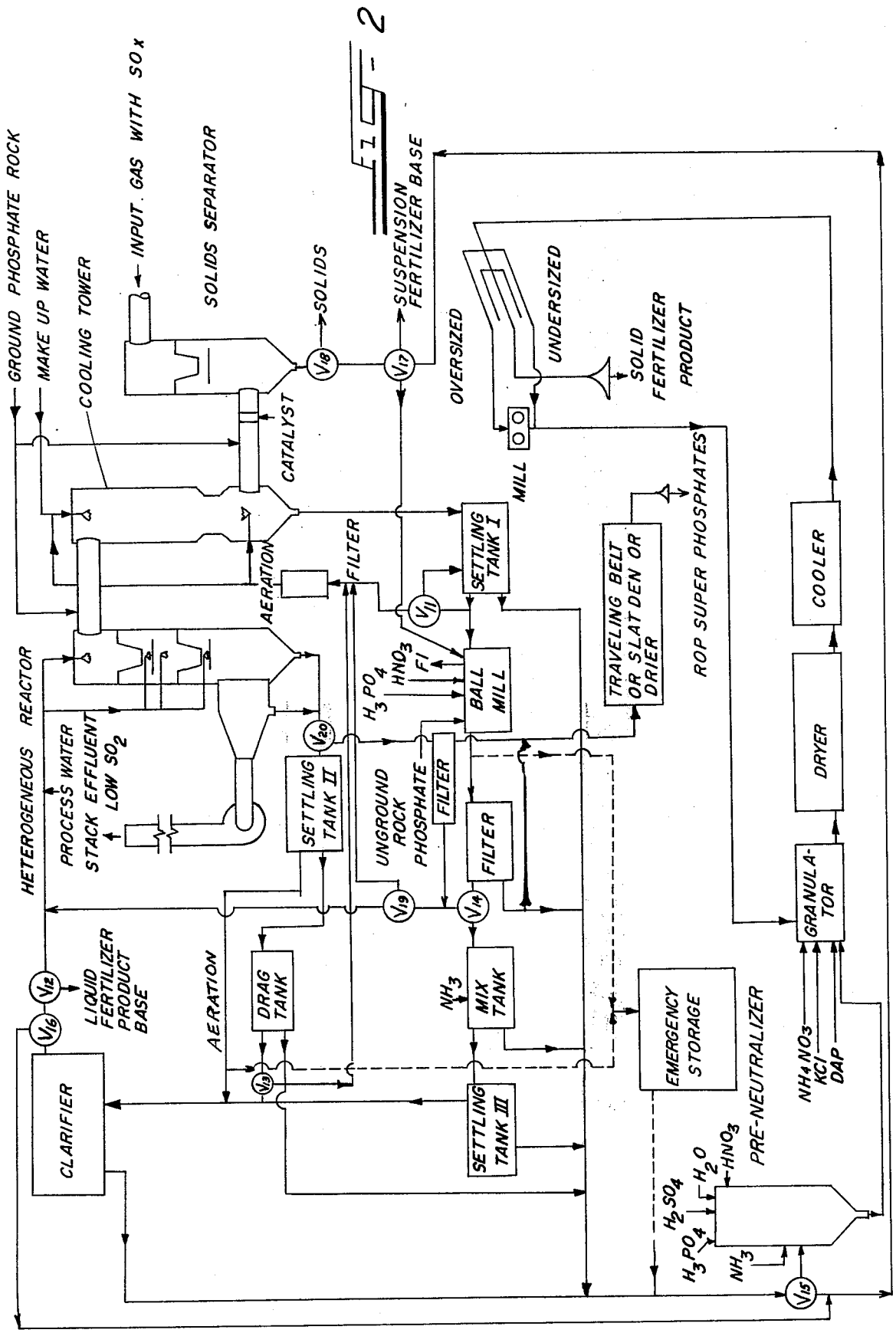

PROCESS FOR PRODUCTION OF FERTILIZERS

Phosphate fertilizers have become very important in the agricultural economy throughout the world. A major phosphate source for such fertilizers is natural phosphate rock. However, in its natural form such phosphate is nearly insoluble in water. To utilize the phosphate from natural phosphate rock sources, various acidulation processes utilizing sulfuric, phosphoric or nitric acids have been used.

While phosphoric acid can be produced by the action of either hydrochloric acid or nitric acid on the natural phosphate, such processes have not been satisfactory since the soluble nature of the salts in the resulting products make separation of phosphoric acid commercially impractical. When natural phosphate rock is treated with sulfuric acid, the products are phosphoric acid and gypsum (hydrous calcium sulfate) and other sulfate salts. Due to their insolubility, the sulfate salts may be readily separated from the phosphoric acid.

Prior methods of fertilizer production have employed sulfuric acid in the manufacture of phosphoric acid by the well known "wet process". Super phosphate is the term generally applied to the product obtained by treating finely ground phosphate rock with sulfuric acid and has about 16 to 20 percent available $P_2O_5$. In the manufacture of super phosphate, a source of concentrated sulfuric acid must be available as well as sources of high grade rock phosphate. The reaction is dependent upon good liquid-solid reactant mixing. The lower grades of phosphate rock which contain higher percentages of impurities are not satisfactory for prior processes for the manufacture of phosphoric acid or other phosphatic fertilizers. Many of the impurities contained in the natural phosphate rock react with sulfuric acid and the consumption of sulfuric acid becomes too great. Further, due to the poor reaction kinetics involved in the two phase liquid-solid reaction system in the manufacture of phosphoric acid a curing or tempering period requiring as much as several days is necessary. In the manufacture of non-granular phosphatic fertilizers a long curing process, as much as several months, is required to complete the reaction reducing the free sulfuric acid to a minimum. In the production of granulated phosphatic fertilizers using phosphatic rock the amount of good liquid solid reactant mixing is important to minimize bag rot or other corrosive action from excess free acid. The hardness of fertilizer granule is dependent upon the avoidance of unreacted sulfuric acid.

Triple super phosphate providing a highly concentrated phosphatic fertilizer containing from 44 to 46 percent $P_2O_5$ has been manufactured by the decomposition of phosphate rock using phosphoric acid. In this case the citrate soluble phosphate is obtained using only expensive phosphoric acid.

It is an object of this invention to overcome many of the disadvantages of prior processes for production of phosphatic fertilizers.

It is another object of this invention to provide a process for the manufacture of fertilizer from relatively low grade natural phosphate rock sources.

It is another object of this invention to provide a process for production of fertilizer which utilizes the calcium present in natural rock phosphate sources.

It is still another object of this invention to provide a process for the production of fertilizers which are either solid, liquid or suspension.

It is an object of this invention to provide for a more complete reaction than previously obtained between phosphate rock and sulfuric acid in a heterogeneous gas-liquid-solid mixture.

It is another object of this invention to provide a process for the production of fertilizer by utilization of dilute sulfuric acid produced from sulfur oxides obtained from the burning of sulfur containing natural fuels.

It is another object of this invention to provide a process for the production of fertilizer by utilization of sulfuric acid obtained as a by-product of sulfur generating processes such as wood pulp digestion tanks.

It is an object of this invention to provide a process for production of fertilizers at an inexpensive source of sulfur oxides which is also in geographical proximity to the user of the fertilizer.

It is another object of this invention to produce phosphatic or other basic plant nutrient chemicals which are readily ammoniable.

It is still another object of this invention to render the ammoniated or unammoniated phosphate or other basic plant nutrient readily granulatable.

It is yet another object of this invention to make use of the sulfur oxides from burning of sulfur containing natural fuels using naturally occurring phosphate rock in conjunction with anhydrous ammonia without loss of free ammonia from the reaction system.

These and other objects will become readily apparent by a reading of the detailed disclosure and reference to the figures showing preferred embodiments wherein:

FIG. 1 shows schematically one embodiment of a process for the production of phosphate fertilizer according to this invention utilizing ground phosphate rock; and FIG. 2 shows schematically one embodiment of a process for the production of phosphate fertilizer using unground rock phosphate according to this invention.

This invention utilizes the sulfur oxides obtained from the burning of sulfur containing fossil fuels such as coal or oil in a conventional boiler or sulfur oxides obtained as stack gas effluents from any industrial plants such as the chemical, paper, refinery, fertilizer, steel or coke operations provide. While the preferred embodiments will be described with respect to sulfur oxides obtained from the burning of coal, it will be understood that sulfur oxides may be provided by any other suitable source. It is readily apparent that the process of this invention enables the use of high sulfur content coal, sulfur content of higher than about two and one-half percent being preferred. Presently there are great quantities of coal which are not being utilized due to its excessive sulfur content. There is increasing demand for energy sources other than desulfurized oil or gas. The satisfactory utilization of high sulfur content coal would alleviate such demands most effectively and permit use of existing combustion equipment with slight modification. Very expensive techniques for the removal of pollutant sulfur oxides from such stack gases have not proved satisfactory. This invention provides a process which encourages the burning of high sulfur containing fuels which in many instances, is considerably more economical to the boiler operator due to both higher heat and lower transportation costs. This invention also provides a process for the burning of high sulfur fuels with the utilization of the sulfur oxides thereby produced and resulting in safe levels of final stack effluent with respect to the sulfur oxide content permissible by the appropriate regulations, in fact, in most cases lower than these. It is, therefore, economically feasible for power generating companies or other industries dependent upon sulfur containing coal and oil boiler utilization, as well as those who will have to change from low sulfur coal, oil and gas, to utilize the process of this invention for the production of fertilizer as a by-product of the burning of high sulfur coal and provide local sources with grades of fertilizer materials well suited to good farming practice thereby reducing the high cost of transportation now prevalent in the fertilizer industry. Frequently, utilization of the process of this invention permits utilization of local fuel again reducing high transportation costs. The investment in equipment for use in this invention provides both a means for $SO_x$ conversion and fertilizer production. This is very important since the fertilizer industry is continuously attempting to balance the facilities for supply of fertilizer to satisfy the demand.

The stack gas containing sulfur oxides and fly ash from a conventional coal fired boiler at approximately 380° to 450° F. may be passed through conventional equipment for fly ash and solids separation from the gas stream. The fly ash separator may be a single stage of the heterogeneous reactor more fully described later in this specification. In instances where it would not be impractical to mix the phosphate rock with the coal prior to being fired to the boiler, it would not be desirable to use the fly ash separator.

In the process of this invention, it is desirable to oxidize $SO_2$ from the input gas stream and hydrate so that the sulfate ion is formed and there is minimal $SO_2$ in equilibrium with the solution. Maximizing oxidation of $SO_2$ decreases the probabilities for $SO_2$ escape to the atmosphere. $H_2SO_3$ acid solutions or salt solutions which have the $SO_3$ radical tend to decompose forming $SO_2$. Therefore, it is desirable to oxidize the sulfur oxides as completely as possible to form the sulfates which do not decompose. This oxidation can be effected by various methods, such as by use of an oxidation catalyst in direct contact with the stack gas, especially, if the solids had been removed; or the oxidation can be effected in a separate air-solution absorption tower using countercurrent air; or in a heterogeneous reactor cocurrent absorber such as referred to in other portions of this application; or in any absorption device which brings air into contact with the liqueur resulting from the absorption of the sulfur oxide gases.

The hot gas is passed into a direct contact cooler-absorber where some of the sulfur oxides are absorbed by direct contact by the gas to a cooling liqueur which can be water or water to which a chemical has been added to increase the pH to promote greater absorption reaction. The solution which remains after water evaporation as a result of cooling the gas is fed to a settling tank from which the decant liquid can be recycled to the cooler-absorber. The direct contact between the sulfur oxides containing gas stream and the liquid cools the gas stream as a result of the evaporation of some of the liquid phase. The evaporative cooling is conducted to about the point of saturation of the gas with the vapor and then the gas stream passed to a reaction-absorption tower either in cocurrent or countercurrent flow relative to an absorbing liqueur.

The function of the reaction-absorption tower is to bring into solution whatever sulfur oxides, and possibly nitrogen oxides, were not reacted in the contact cooler-absorber. In this reaction-absorber stronger chemical solutions with higher pH are used. The gas having been stripped of the acid anhydrides then exits through a demister and a blower out a stack to the atmosphere. In some installations, a reheat to elevate the temperature above the saturation level may be specified prior to exhausting.

One chemical utilized to accomplish the sulfur oxides removal is the calcium found in phosphate rocks. The calcium in its original phosphate rock form is not water soluble and therefore, must be rendered soluble by reacting it with acid. In this process the sulfuric and sulfurous acids formed from the sulfur oxides contained in the flue gas, coupled with phosphoric or various phosphatic acids or nitric acid or various nitrogenous acids to increase the reactivity of the acid solution relative to the rock, may be used to digest the phosphate rock and solubilize the calcium ion.

The chemical reaction between the acid and ground phosphate rock may be conducted in a suitable heterogeneous reactor. The rock phosphate may be used in unground form and the reaction between the acid and phosphate rock conducted in a ball mill. The function of the ball mill is to promote reaction by mechanically fracturing any coating of the phosphate by calcium salts. When a mixture of the phosphatic acids or nitrogeneous acids is used in combination with the sulfuric and sulfurous acids it may be desirable to use the mechanical grinding when unground phosphate rock is introduced to the process. Another means of reacting the ungound phosphate rock with the acids, if the boiler operation is not impeded or erosion does not prohibit, such as with underfeed or traveling grate stoker systems, is to add phosphate rock to the coal fired boiler itself and ground with the klinker in the ball mill reactor; or the rock-klinker mixture can be dry milled prior to addition to the towers. The acidulation can also be conducted by contacting pre-ground phosphate rock with the mixture of acids. The powdered or ground phosphate rock may be introduced into swirling phosphoric acid in a cone for reaction prior to the inroduction to reaction tanks. If granulation is not desired, the slurry from the acidulation cone is passed to a moving slat or belt conveyor for hardening and cutting to form the pulverized or Run-Of-Pile (ROP) product. Another alternative is to bring the acidulated rock into a granulation system. If the oxidation in the towers does not result in strong enough sulfuric-sulfurous acids, then concentrated phosphoric acid must be combined with those acids to increase the acidulation rate. If desired, nitric acid may also be used. The same consideration with respect to acidulation holds true regardless of the manner in which the slurry is formed. Another means of acidulation is adding ground phosphate rock with excess air prior to the cooling tower. Ground phosphate rock may also be added to the top of the heterogeneous reactor. The rock should be ground to at least the commercial grind of 90 percent minus 100 mesh. Phosphate rock suitable for use in this invention has B.P.L. down to as low as about 50. B.P.L.'s about 55 to 65 are particularly suitable for use in this invention. B.P.L.'s of 66 and less are considered low grade phosphate rocks which are not suitable for presently used processes for production of fertilizer but are suitable for the process of this invention. The low cost of the low grade phosphate rock makes the process of this invention very economically attractive. Rock having B.P.L.'s higher than 66 are also suitable for the process of this invention.

When the calcium from the phosphate rock is made available by acid attack for neutralization of the sulfur oxides by any of the previous means, the entire calcium requirement for the process may be supplied by such means instead of the necessity of providing costly calcium from outside sources. This effects savings by not having to purchase the calcium from an outside source. If additional basic ions are needed to remove the acidic ions formed from the hydration of the oxides of sulfur, ammonia may be added to the system or any other basic low cost plant food nutrient may be used. As an example, if the economics permit, potassium carbonate is another basic or buffering ion.

The slurry resulting by the acidulation of the rock phosphate is then made up of calcium, sulfate, sulfite, phosphate and possibly nitrate ions, other ions brought in with the desired acids, plus ions released from the rock as a result of the acidulation. If nitrogen is desired in the end fertilizer product, the cheapest source is anhydrous ammonia which can be fixed by the acid slurry. The anhydrous ammonia may be added to the slurry to neutralize it to the point where the acidity will not create handling or storage problems. For example, granules having too high a free acid content tend to be soft even after drying. If bagged, the excess acid attacks the bag causing what is referred to as "bag rot". If granules with excess acid are handled in bulk and stored, solutions are formed on their surface upon drying, result in the granules knitting causing caking. The favorable economics in this neutralization step result from the fact that fixed nitrogen or that existing in solid form, has a higher sales value than the original gaseous ammonia.

The ash that was retained in the slurry contains minerals which originally were derived from plants later petrified to form the coal. These chemicals have a two fold value. They are also slightly basic as was evidenced by the manufacture of soap in the past by leaching these chemicals from the ashes and saponyfying fats to make soap. However, the most significant contribution is that these minerals that contributed to the strength and health of these prehistoric plants are capable of doing the same for present day crops. These are normally known in the industry as trace nutrients, or micro-nutrients. This also gives added value to the fertilizer product. The most significant contribution, economy-wise, is that this permits the operator of the boiler to dispose, in an economic fashion, of the fly ash by having it returned to the soil while contained in the fertilizer. Otherwise, the operator would have to spend money disposing of the ash in addition to the cost of abating the pollution.

This invention uses calcium derived from phosphate rock to react with acids of sulfur which are very economically available. It has previously been considered impracticle to acidulate phosphate rock with the very dilute sulfuric and sulfurous acids that prior scrubbing processes made available. The use of strong phosphoric acid by adding concentrated phosphoric acid to the weak acids of the sulfur oxides, the mixture of which increases the temperature and increases the capability to attack the rock making the calcium ion available, has been found advantageous. Use of weak sulfur acids derived from stack gas effluents to cut, or dilute, strong acids permits greater generation of fertilizer phosphates than the use of the strong acid alone.

In prior practices, concentrated sulfuric acid was added to phosphate rock to make single super phosphate. The resulting acidulate analyzed approximately 20 percent $P_2O_5$ when cured. Concentrated phosphoric acid mixed with the rock in proper stoichiometric proporations resulted in 46 percent $P_2O_5$ analysis when cured.

A third commercial method, one process of which is referred to as the Prayon Process, results in the manufacture of phosphoric acid using proper stoichiometric amounts of sulfuric acid and phosphate rock. Enough sulfuric acid is used to precipitate all of the calcium in the phosphate rock as sulfate and other insoluble salts originating from the rock. The slurry is then conveyed to a moving pan filter, and the liqueur is separated from the solids which is called black phosphoric acid, as opposed to furnace grade which is made from the burning of phosphorous and the resulting $P_2O_5$ gas is hydrated in water to form white, or clear, phosphoric acid. In the manufacture of the black acid, the filtration is becoming more and more difficult because the grade of rock available is deteriorating. The process of the present invention avoids this costly separation.

The process of the present invention can use lower grade phosphate rock than existing fertilizer manufacturing processes. It can use low grade rock because it doesn't have to separate sulfates (calcium) from the resulting acid, and because of the reduced requirement of phosphoric acid or costly concentrated sulfuric acid input to the process. Exemplary of the process of this invention 25% of the $P_2O_5$ in the phosphate fertilizer may be derived from the phosphoric acid and 75% from the phosphate rock in the commercial version of our process. The amount of phosphate rock to be used is that necessary to supply calcium to neutralize all of the sulfur oxides available from flue gases or other cheap sulfur oxide sources. Therefore, when the resultant slurry is reacted with ammonia, the benefit of the phosphate that was stripped of its calcium ion is derived in tying up the ammonia. The phosphoric acid used to assist in the acidulation is then available to react with the ammonia in the same way as when diammonium phosphate is produced. If adequate oxidation of the sulfur dioxide to the trioxide results enabling thorough hydration to result in sulfates production and a small amount of dilution water can be used or enough recycle permitting the acid concentration to rise above 40%, then very little phosphoric acid is required to be supplied to a ball mill reactor. We are using the ball mill as a reactor in connection with the acidulation to speed up the reaction into a matter of minutes by physically assisting the reaction through a combination of mixing and grinding.

FIG. 1 starts with a single stage dry heterogeneous reactor designed to mechanically separate the fly ash. This is optional. Also, if ground phosphate rock fluidized with excess air were to be introduced into the evaporative cooler, it would be brought into the cooling tower following the dry separator as shown. In the cooling tower the sulfur oxides contained in the stack gas are absorbed in the droplets of the solution emanating from the cooling sprays, and the acidified droplets in turn react with the fine particles of phosphate rock. This acidulation of the rock strips the calcium from the phosphate rock leaving a phosphatic slurry and calcium salts of the various sulfur oxides. The cooling tower could be replaced by a single stage heterogeneous reactor without an impingement plate. The slurry from the cooling tower goes into a settling tank.

In settling tank I, the solids are allowed to drop to the bottom and the clarified liquid is siphoned from the top and recirculates to the cooling tower so that whatever calcium ions are in solution can further react with the sulfur oxides that have been hydrated to acids. If the degree of oxidation of the sulfur is not sufficient to absorb more than approximately 25 percent of the sulfur oxides at the cooling tower stage then strong commercially available phosphoric acid must be added as shown in figure to settling tank I to accelerate the acidulation of the phosphate rock.

The gas that had a part of its sulfur oxides removed and is now saturated with the vapor passes to the heterogeneous reactor. These gases could also include particles of ground rock which had not been agglomerated or reacted within the cooling tower. Also, additional ground phosphate rock may be fluidized with air and added to these gases. The mixture enters into the top of the heterogeneous reactor into which is supplied solution containing basic ions to take out the remaining sulfur oxides by reacting these oxides with the solution. Also, whatever particles of solid ground rock carried over, or added, would be agglomerated and brought down together with the solution into the settling tank II. Here again, if the concentration of the sulfuric acid would not permit a high enough percentage of rock acidulation, strong commercially available phosphoric acid would have to be added to settling tank II. This invention permits use of dilute, less than 60 weight percent sulfur acid, which has not previously been used commercially to our knowledge. Again, the solids would be allowed to settle to the bottom and the clear decant would be recycled into the heterogeneous reactor.

The gas, now having been cleaned of the sulfur oxides, the fly ash and phosphate rock particles is pulled by the blower into a demister and blown out of the stack. A re-heater (not shown) might be requested by some boiler plant operators to elevate the gas effluent temperature above the dew point.

The pH in the heterogeneous reactor is controlled by the dissolved calcium from the phosphate rock and may be further controlled by addition of anhydrous ammonia, potassium carbonate or any other economical basic plant nutrient. A range of pH of from 3 to 8 may be used depending upon degree of sulfur oxidation, pH in settling tank I, supplemental acid used, and sulfur content of the coal. Further, to increase the collection efficiency of the sulfur oxides, some of the solution from settling tank II can be brought back to settling tank I, controlled by valve $V_1$, to increase the pH in settling tank I or vice versa. If the higher pH is held in settling tank II, a range of pH of 2.5 to 4 could be maintained in tank I, again depending on degree of sulfur oxidation, pH in settling tank II, supplemental acid used, and sulfur content of the coal. Under certain conditions of sulfur content in the coal, tolerable $SO_2$ losses, degree of sulfur oxidation, and supplemental acid used, the pH in both tanks may be maintained the same, for simplicity of operation and selection of structural materials. For the purpose of controlling pH and reaction of the rock between settling tanks I and II, the tanks are interconnected in such a way that flow of solids or liquids can occur between them.

The bottoms are taken out of both settling tank I and II as solid-liquid slurry combined and brought into the pre-neutralizer or granulator or separate between two, dependent upon the percentage of solids in the liquid. The more liquid, the more would go into the pre-neutralizer. This is controlled by valve $V_2$. Here again, whatever additional acidulation of rock is desired, strong phosphoric and, if desirable from a formulation and vaporization viewpoint, strong nitic acid as shown in FIG. 1, can be added to the pre-neutralizer to promote the additional acidulation and evaporation. Continued acidulation would occur in the granulator and could be completed in the drier, if desired. When additional anhydrous ammonia is added to the pre-neutralizer along with phosphoric acid the heat of reaction boils off the liquid. If there is a large amount of solids, as compared to the liquid, in the solid-liquid slurry from the settling tanks, it would be brought directly into the granulator where reaction between anhydrous ammonia and other acids takes place without the need for the extra vaporization from the pre-neutralizer. If an N-P-K, or complete granulated fertilizer is desired, then potash is added to the granulator in amounts required by the desired analysis. As per standard industrial fertilizer practice, the material flows from the granulator to a drier to a cooler, is sized and dependent upon the amount of recycle required on sized product might be included oversized, ground, mixed with "fines" or undersized and recycled to the granulator. Here again, if there is not much liquid then the amount of recycle is decreased and may not require grinding of on sized product.

The process can be operated to produce a liquid fertilizer product base as shown in FIG. 1 by adjusting valve $V_3$ to permit some of the recirculating liqueur to be taken out of the system. To this could be added white potash, uncoated ammonium nitrate, or any other water soluble plant nutrients in an agitated tank (not shown) for formulation to the grade desired as per standard commercial practice.

A suspension fertilizer base may be obtained by proper adjustment of valve $V_6$. Plant nutrients and agents required to stabilize the suspension could be added in an agitated tank (not shown). Some of the very fine silicious materials originating from the fly ash and the acidulated rock add to this suspension stabilizing phenomena. As seen from FIG. 1, liquid suspension and solid fertilizers can be produced by the process of this invention dependent upon the final product demand.

The heterogeneous reactor used in the process of this invention may be any suitable apparatus which promotes rapid chemical reaction of reactants in heterogeneous gaseous-liquid-and/or solid state such as a turbulent bed packing absorber and other reactors designed to avoid plugging known to the art. One particularly suitable apparatus is described more fully in U.S. Patent Application Ser. No. 677,750 Heterogeneous Reactor and Process, L. J. Pircon, filed concurrently with this application.

The heterogeneous reactor is shown in FIG. 1 defined by outer casing 10. The cross-sectional shape of outer casing 10 is preferably cylindrical, but may be square, rectangular, triangular, hexagonal, or other symmetrical polygon shape, but other geometrical shapes symmetrical with respect to the axis of the apparatus are satisfactory, the principal requirement being that it enclose the apparatus in generally liquid and gas type relationship while providing controlled gas flow through the interior portion. To allow maximum flexibility in the utilization and maintenance of the heterogeneous reactor casing 10 may be fabricated in sections having sections having flanges as shown by 11 and 13 at each end for rigid coupling to adjacent casing sections having like flanges 12 and 14. Instead of the flanges as shown in FIG. 1, any suitable coupling means may be utilized. To allow for maximum economy of original fabrication and installation of larger units the sections may be welded prior to shipment and erection. FIG. 1 shows a two stage heterogeneous reactor.

The heterogeneous reactor is arranged with its axis vertically having the reactant solid-liquid-gas inlet in the upper portion. The inlet may be in either a vertical or horizontal position. The reactant flow is supplied to the top of casing 10 through the inlet at a velocity and pressure sufficient to carry it through the apparatus. The inlet pressure is negative relative to the atmospheric exhaust in most instances so that the blower inducing the flow is not affected by abrasion due to any solids which might be contained in the inlet gas or chemical attack by corrosive components. The apparatus is a low pressure apparatus and generally casing velocities may be in the range of about 400 to about 900 feet per minute prior to introduction into nozzle 21.

Spray 41 may be located in the central portion of inlet to cylinder 10 and introduces liquid or solid reactant, adsorbent, absorbent or liquid coolant in droplet form to the reactant stream, the droplets being preferably in the order of about 40 to about 1500 microns in diameter. Larger droplets may be desired to compensate for evaporation when evaporative conditions exist. Spray 41 is preferably a solid cone spray which by itself or in combination with several like it arranged in a pattern permitting the introduction of droplets of water across the entire cross section of the pollutant gas stream prior to entry of the gas stream into cone 21. Different sized liquid droplets are desired to provide maximum differential accelerations, decelerations and velocities through the apparatus, thus increasing reaction. It is desired that the spray pattern extend across the full area of entrance 25 of nozzle 21 and any suitable pattern of sprays or multiple sprays is satisfactory. Spray 41 may also be used to introduce solid particles of the above specified sizes to the reactant stream at the entrance 25 of nozzle 21.

The reactant containing heterogeneous solid-liquid-gas stream enters converging nozzle 21 through entry 25. It is preferred that the entry be round and the nozzle conical, but other geometrical shapes symmetrical with respect to the axis of the apparatus are satisfactory. The cone ratio, defined as the effective cross-sectional area of the entry divided by the effective cross-sectional area of the outlet, should be about 2 to about 64, about 2 to about 36 being preferred. By effective cross-sectional area is meant the area at 90° to the axis of gas flow.

The length of the converging portion of the nozzle is determined by the angle of convergence shown as A in FIG. 1 and the nozzle ratio as defined above. It is preferred that the mean angle of convergence be about 6° to about 20°, about 10° to about 16° being preferred. By mean angle of convergence is meant the angle measured between a straight line drawn from the entry to the outlet and a vertical line as shown by A in FIG. 1. The sides of nozzle 21 do not need to be straight, but may be somewhat convex or concave.

The distance from outlet 24 to the impingement surface 31 should be about 1.3 to about 2.5 times the diameter of outlet 24, about 1.6 to about 2.0 being preferred.

A suitable impingement plate is shown as 31 in FIG. 1. Impingement plate 31 is of sufficient size to have substantially all of the particulate matter from nozzle exit 24 impinge upon it while affording sufficient area between the impingement plate and cylinder 10 to allow passage of the gas around impingement plate without appreciable pressure drop. While impingement plate 31 is shown as a flat plate, a slightly concave plate to facilitate the passage of gas around the edges and to facilitate the removal of particulate matter may be utilized. For reactions not requiring separation of solid and liquid phases from the gas phase, or mass transfer phenomena such as associated with evaporative processes such as take place in the cooling tower, an impingement surface would not be needed.

Additional sprays may be suitably located above impingement plate 31 so that the spray therefrom washes particulate matter off impingement plate 31 for progress through the apparatus and discharge at the bottom. Such sprays may be multiple sprays located around the periphery of impingement plate 31 or a satisfactory spray may be located in the central position. When sufficient fluid is used, the impingement surface will be the fluid itself and the particulate matter will not strike or adhere to the impingement plate, but will be entrapped in the fluid. The essential criteria of the sprays upon impingement plate 31 is that they provide sufficient fluid with sufficient force and direction to keep impingement plate 31 relatively free of particulate matter. The reactor may also be operated without the supplemental sprays to clean the impingement surfaces.

Because of the unitized construction of the apparatus of this invention, as shown in FIG. 1, multiple nozzle-impingement means stages may be readily placed one on top of the other, resulting in the series of three units as shown in FIG. 1. One to about 6 of the series connected stages of nozzles are suitable for heterogeneous reactors for use in this invention. Preferably 2 to 4 stages are utilized in series. The number of stages is controlled by the difficulty of reaction of the reactants, and with especially difficult materials, a greater number of stages may be necessary. This could also be influenced by the angles of convergence or effective cross-sectional area ratios of the nozzles.

Beneath the impingement plate of the bottom stage is reservoir 15 for removal of the liquid and slurry. Exit means for the removal of the clean gas are also provided beneath or adjacent bottom-most impingement plate 33 and shown in FIG. 1 as conduit 16. Either within the apparatus or external to the apparatus it is preferred to have demister 17 in the clean gas effluent line to remove fine droplets of liquid remaining in the gas stream together with any solids or gases trapped by such droplets.

The vertical arrangement of the converging nozzles is particularly advantageous since using such an apparatus with a demister having a nozzle ratio of 4 and a nozzle angle of 12°, the pressure drop in one nozzle is 3.5 inches of water; with two nozzles in series is 5.7 inches of water; with three nozzles in series is 7.0 inches of water; and with four nozzles in series is 8.3 inches of water when an inlet velocity of approximately 2100 feet per minute was used. Thus, it is seen that the pressure drop of the vertical series of nozzles is advantageously less than cumulative.

The second stage, as shown in FIG. 1, is identical in configuration to the first stage. It is recognized, however, that the water or liquid chemical supplied to both the nozzles preceeding the cone entrance and the nozzles supplying liquid to the impingement surface of the same stage or of different stages may be individually controlled. That is, the volumes may be different and the liquid used may be different in each instance.

The passing of the liquid, solid and gaseous reactant in the stream through nozzles such as 21, promotes intimate contact between the liquid, solid and gaseous reactant and results in desired heat reaction rates. It is believed the high reaction efficiency of the heterogeneous reactor and process is due to differential velocities and differential acceleration and deceleration achieved by the combination of non-compressible matter passing with the compressible gas through nozzle 21 with the opportunity for relatively great expansion following exit from nozzle exit 24. In the reactant containing stream there is a size range of compressible and non-compressible matter. Additional particles added to the gas stream by addition of solids or liquid droplets are principally non-compressible as desired to increase the non-compressible component of the gas stream. Spray 41 may be used to introduce a wide selection of liquid or solid particle sizes to the gas stream and together with a relatively wide span of liquid or solid particle sizes in the inlet gas stream, promote extremely high collision rates and high compressible gas rates flowing past the non-compressible particles and droplets resulting in very highly efficient reactions.

In order to minimize the height of the heterogeneous reactor as shown in FIG. 1, multiple cones may be placed in each stage as further described in said concurrently filed U.S. patent application identified earlier.

Another preferred embodiment of this invention is shown in FIG. 2 providing for the use of unground phosphate rock. This is made possible by using the ball mill as shown in FIG. 2 as a combination grinder-reactor into which the unground phosphate rock is introduced. The use of dry ground phosphate rock in this embodiment is optional. When desired, the ground phosphate rock can be introduced into the heterogeneous reactor as shown in FIG. 2. The flue gas flow in FIG. 2 is the same as in FIG. 1. The liquid flow differences are consistent with the objective of maximizing the acidification reaction in the ball mill. For this reason, it is desired to achieve as low a pH in the cooling tower as possible to still absorb sulfur oxides. This is accomplished by maximizing the oxidation of the $SO_2$ to $SO_3$ rather than the increase in pH as desired in the process shown in FIG. 1 by the addition of $NH_3$ and/or $K_2CO_3$. If a pH of 2 with high sulfur oxidation degree and rate were achieved, then the percentage of sulfuric acid could be higher thereby requiring less phosphoric acid. Therefore, the higher the oxidation, which can be achieved by use of catalyst in the gaseous stream or aeration of the liquid used in the heterogeneous reactor or oxygen absorption in a heterogeneous reactor or cooling absorber, the higher the concentration of produced sulfuric acid which increases the acidulation capability in the ball mill. Also, if monocalcium dihydrogen orthophosphate is added to the solution from the system and/or monoammonium hydrogen sulfate to increase the pH, more of the hydrates of sulfur oxides can be absorbed in the cooling tower from which the liqueur is brought into the ball mill to acidulate the unground phosphate rock. The less concentrated the recirculating liqueur is with respect to the sulfates and sulfites, especially the sulfates, the greater the quantities of concentrated phosphoric acid are necessary to be blended with the acid solution produced in the cooling tower. Therefore, the control of acid activity and strength results from the blending of these acids with the objective to conduct the acidulation reaction in the ball mill as rapidly as possible so that high percentage completion of the desired reaction is achieved in the ball mill reactor-mixer. The more dependent upon the acid from the sulfur oxides the process becomes, the more important is the grinding action of the ball mill so as to grind off primarily the calcium sulfate and sulfite coatings tending to reduce the reaction rate as well as degree. The solid-liquid slurry from the ball mill could go through a filter, the solids from which could go directly to a slat den or traveling belt conveyor whose rotary cutter or some means of pulverization manufactures Run-Of-Pile (ROP) analyzing between single and triple super phosphate. The feed to the den could also come from the bottoms of the heterogeneous reactor. The solid-liquid slurry from the ball mill is shown passing into a separating system, denoted as a filter in FIG. 2, where the high solids slurry is passed to a pre-neutralizer, granulator, drier and processing to produce solid fertilizer product. The solid-liquid slurry from the ball mill could go to emergency storage, as shown by the dotted line on FIG. 2, should a breakdown occur. The filtered solution can be recycled to the heterogeneous reactor as shown in FIG. 2.

Since the sulfur oxides not absorbed in the cooling tower remain in the saturated gas relative to moisture and the mixture flows into the heterogeneous reactor, the calcium solution would strip these sulfur oxides from the gas stream forming a slurry which would flow to a settling tank II. The decant from the settling tank can be recirculated to the heterogeneous reactor through an additional aerator, as shown in FIG. 2, to increase the efficiency of sulfur oxide stripping. It may also be desirable to pass the decant through a clarifier to further remove solids to prevent plugging of nozzles in the heterogeneous reactor.

Another option is for the bottoms from the heterogeneous reactor to pass through a filter which would polish the liqueur to keep from plugging the nozzles in the heterogeneous reactor and the solids could then go to the drier or conveyor or granulator. If the conventional granulation plant is built in conjunction with the absorption and rock reaction system then the slurry from the clarifier, settling and drag tanks could all flow to the pre-neutralizer or granulator or both, dependent upon the concentration of solids. Also, the use of the conventional granulation plant allows anhydrous ammonia to be added to the mixing tank shown in FIG. 2, the slurry from which flows to settling tank III. The decant from settling tank III is passed through the clarifier or some device for removing solids to prevent plugging of nozzles in the heterogeneous reactor. This allows for additional pH control in the heterogeneous reactor. The bottoms from settling tank III join the other solid-liquid slurry streams for introduction to the pre-neutralizer or for combination with the clarifier liquid stream from valve $V_{16}$. The slurries going either to the pre-neutralizer or granulator or both, are processed to the finished solid granulator fertilizer product in the same manner as described above with respect to FIG. 1.

The liquid fertilizer product base is taken from the recycle stream to the heterogeneous reactor nozzles flowing from the clarifier by means of valve $V_{12}$. This liquid is conveyed to an agitated tank (not shown) to which white potash non-coated ammonium nitrate and other conventional liquid fertilizer ingredients are added to formulate a desired grade.

The liquid from the clarifier may also be passed through valve $V_{16}$ joining the solid slurry stream below valve $V_{15}$. The resultant mixture conveyed to valve $V_{17}$ and can be used as a suspension fertilizer base similarly to that described with respect to FIG. 1. Therefore, it is seen that the process of this invention is a process for the production of fertilizer comprising reacting sulfur oxide containing gas and water in a multiple state reactor to form sulfur containing acid, reacting the sulfur containing acid with a basic ion selected from the group consisting of calcium, ammonium and potassium ions, the calcium being derived from a salt selected from the group consisting of phosphatic and nitrogeneous salts to form a fertilizer selected from the group consisting of phosphatic, nitrogeneous and potassium fertilizers and combinations thereof.

The flow of matter of gaseous, solid and liquid states through the heterogeneous reactor, cooler-absorber and other flow contact devices involved in the process and apparatus of this invention may be countercurrent or cocurrent in any combination. That is, the gas stream may be cocurrent to both liquid and solid, cocurrent to one and countercurrent to the other or countercurrent to both liquid and solid materials.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A process for the production of fertilizer and removal of sulfur oxides from stack gases comprising reacting sulfur oxide containing gas and water at a pH of 3 to 8 in a multiple state reactor to form sulfur containing acid, maintaining the pH of solution of said sulfur containing acid at 3 to 8 with a basic ion selected from the group consisting of calcium, ammonium and potassium ions, said calcium being derived from a salt selected from the group consisting of phosphatic and nitrogeneous salts to form a fertilizer selected from the group consisting of phosphatic, nitrogeneous and potassium fertilizers and combinations thereof, said basic ion being rendered water soluble by reaction with said sulfur containing acid at a pH of 2.5 to 4 and the solution increased to a pH of from 3 to 8 so as to facilitate the reaction of the sulfur oxide.

2. The process of claim 1 wherein said sulfur oxide containing gas is obtained from the combustion of fossil fuels.

3. The process of claim 2 wherein said fossil fuel is coal.

4. The process of claim 1 wherein said sulfur oxide is obtained from sulfur producing chemical reactions.

5. The process of claim 1 wherein said sulfur containing acid is mixed with concentrated acid selected from the group consisting of phosphoric and nitric acids and mixtures thereof.

6. The process of claim 1 wherein said sulfur containing acid is utilized in a concentration of less than 60 percent by weight.

7. The process of claim 1 wherein said multiple state reactor is a ball mill to which unground phosphate rock is added.

8. The process of claim 1 wherein said sulfur oxide containing gas is passed through a cooling-absorption tower for oxidation prior to introduction into said multiple state reactor.

9. The process of claim 1 wherein said phosphatic salt is derived from rock phosphate having a BPL of less than 66.

10. The process of claim 1 wherein the multiple state reactor has a low pressure drop and comprises:
a vertical casing which is substantially liquid and gas tight having a gas inlet in the upper portion,
means in the upper portion of said casing for introduction of reactant liquids and solids cocurrent with the gas stream;
a nozzle within said casing having an entry at the upper end in communication with said gas inlet and said nozzle converging from said entry to an outlet at the lower end, said entry having an effective cross-sectional area of about 2 to about 64 times the effective cross-sectional area of said outlet and the mean angle of convergence of said nozzle being about 6 to about 20°;
means for removing liquid and particulate matter from the lower portion of said casing following desired reaction; and
means for separately removing the gas from the lower portion of said casing.

* * * * *